Aug. 16, 1960   I. L. JOY   2,949,028
APPARATUS FOR ULTRASONIC MATERIALS TESTING
Filed Nov. 3, 1955   4 Sheets-Sheet 1

Inventor
Ivan L. Joy.
By Mann, Brown and Hansmann
Attys.

Aug. 16, 1960        I. L. JOY        2,949,028
APPARATUS FOR ULTRASONIC MATERIALS TESTING
Filed Nov. 3, 1955        4 Sheets-Sheet 2

United States Patent Office 2,949,028
Patented Aug. 16, 1960

2,949,028

APPARATUS FOR ULTRASONIC MATERIALS TESTING

Ivan L. Joy, 1616 W. Dudley Road, Topeka, Kans.

Filed Nov. 3, 1955, Ser. No. 544,634

13 Claims. (Cl. 73—67.9)

This application discloses an arrangement for testing solid bodies by means of wave reflection and modulation principles and is an improvement over my prior application Serial No. 324,103, filed December 4, 1952, now abandoned, the disclosure of which, to the extent it is not inconsistent herewith, is specifically incorporated by reference.

The present invention finds particular application in systems utilizing a common sending and receiving transducer, and in such cases permits the blocking effect normally imposed upon the receiving equipment by the transmitted signals to be completely avoided and this desirable feature is inherent in the operation of the invention.

Increased transducer sensitivity is another inherent advantage of the arrangement and it arises from the unique manner in which signals are applied to the transducer by the remainder of the testing system.

The invention also distinguishes from known arrangements in that improved means are provided for gating out reflections returning from discontinuities located in a stratum or level other than the particular stratum under inspection. For example, in inspecting railroad rail and similar material, one may be particularly interested in detecting reflections returning from a region at or near the bolt holes or from a region at or near the base of the rail, and if so, the invention provides means by which either of such strata can be selected to the exclusion of others.

It is the principal object of the invention to provide an improved apparatus for the testing and inspection of the internal structure of solid bodies.

The invention is based upon a unique application of wave reflection and modulation principles to the testing of solid bodies by elastic waves. A pair of vibrations of fixed but different frequencies are produced in succession by a transducer, such as a piezoelectric crystal, and are transmitted through a suitable couplant and into the body under test. The first wave is reflected from a discontinuity, such as a flaw or the other end of the body, and this reflected vibrational energy is mixed with the vibrational energy of the second wave.

Mixing results due to the simultaneous presence in the transducer of these two forms of vibrational energy. Since the transducer is nonlinear in its response, this mixing produces modulation products of the two mixed frequencies. These products, as is well known, consist of the sum and difference frequencies and also the harmonics.

The receiver may be sharply tuned to one of these product frequencies to the exclusion of all others. Consequently the receiver is insensitive to the transmitted signal frequency and of course is not blocked thereby. However, the receiver is sensitive to energy resulting from a mixture of wave energy of the first fixed frequency that is reflected from discontinuities with energy of the second fixed frequency which is applied to the transducer during the time when the reflected wave energy returns to the transducer.

In applying the invention to the measurement of the linear distance between the sending point and the various discontinuities which produce wave reflection, a gating circuit is employed to render the device insensitive to any received energy except that energy which is reflected from discontinuities within the particular segment or strata of the body which it is desired to inspect. This is accomplished by triggering the gating circuit with the pulse that initiates the first wave and by providing delay means for controlling the time of initiation of the gating pulse. The invention also contemplates the use of means for varying the duration of the gating pulse for adjusting the size of the particular stratum being investigated and the range may in fact include the entire length of the body.

Other objects and advantages of the invention will be apparent during the course of the following description.

In the accompanying drawings forming a part of this specification and in which like numerals are employed to designate like parts throughout the same.

Figure 1:
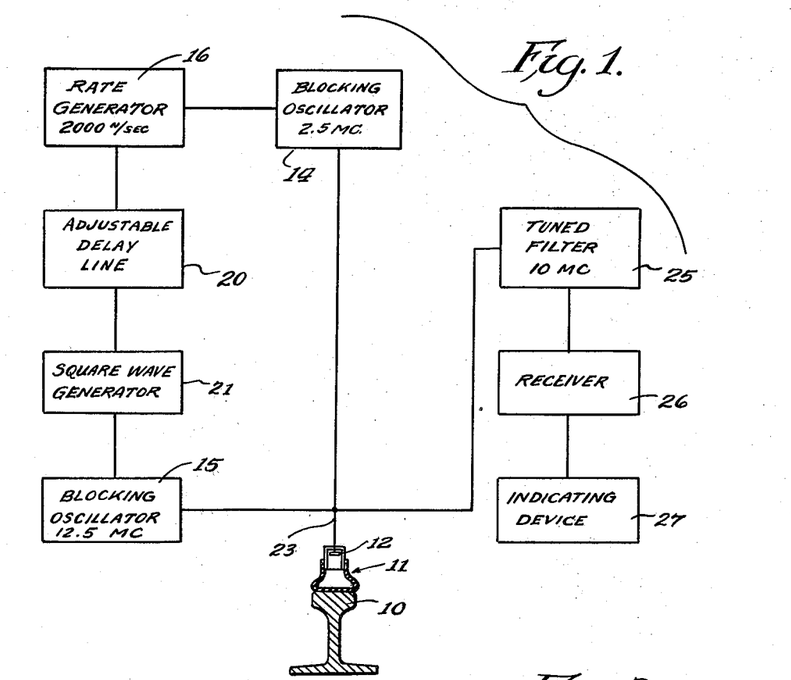
Fig. 1 is a block diagram of the essential components of a system in accordance with the invention.

Referring now to the drawings, and especially to Fig. 1 thereof, numeral 10 designates an object whose interior is to be tested, and which is represented (by way of example) as a railroad rail. Disposed above the upper surface of rail 10 and coupled thereto by a suitable holder 11 is a transducer 12 representing a piezoelectric crystal that is adapted for actuation by electrical signals in the usual manner. The holder 11 is provided with a suitable couplant that is always in contact with the crystal and in addition a suitable liquid is provided between the holder and the rail. This arrangement provides an effective vibration transmitting coupling between the rail and the transducer. It is to be understood that the present invention is applicable to the testing of objects other than rail and in such cases the holder may be modified or entirely eliminated; nor is it essential to the invention that there be relative movement between the transducer and the object under test.

In the system illustrated the transducer 12 acts both as a sender and a receiver of vibrations and therefore is of the reversible type. Application of electrical wave energy to the transducer produces mechanical oscillations and application of mechanical vibrations to the transducer produces similar electrical oscillations.

From the above, it follows that application of electrical energy to the transducer causes the transducer to develop a traveling vibration that is transmitted through the holder 11 and into the rail 10. This traveling vibration is reflected by discontinuities presented by the body and it should be understood that the front and rear surfaces constitute reflecting discontinuities. After reflection the traveling vibration returns (with diminished amplitude) to the transducer and actuates the transducer to produce an electrical output at its terminals. The invention provides for separation of this reflected energy which is of a fixed frequency and accomplishes this separation by modulating the reflected energy with applied energy of a different fixed frequency. One of the modulation products thus produced is utilized in the indicating circuit of the device.

Specifically, in the Fig. 1 form of the invention, this mode of operation is produced by a pair of ultrasonic oscillators 14 and 15 operating at different, but fixed, fundamental frequencies of ultrasonic value, which may be (as shown) 2.5 and 12.5 megacycles respectively.

Both of these oscillators are triggered by a rate generator 16 whose frequency may be adjustable and which serves to fix the number of repetitions per second of the testing cycle as a whole; the rate chosen will be determined in part by the reverberation time of the wave energy in the specimen under test. In metal six inches thick, again by way of example, there may be as many as 5 or 6 reverberations before the magnitude becomes inappreciable. Therefore the rate at which the rate generator triggers the oscillators 14 and 15 must be chosen to prevent interference. In six inch metal, repetition rates as high as 2000 times per second may be employed.

Figure 2:
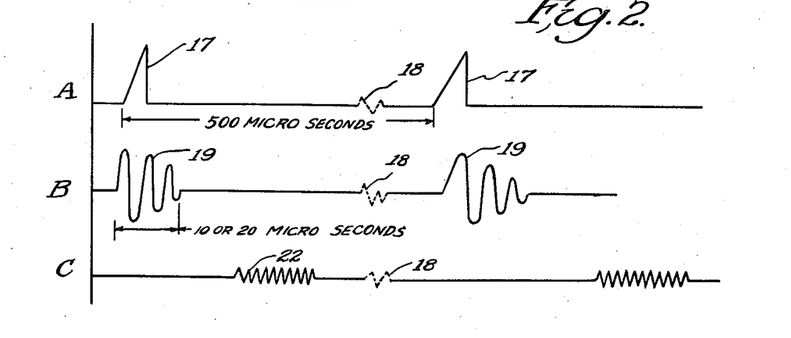
Fig. 2 is a graphical representation of various energy conditions present in the system of Fig. 1.

Curve A of Fig. 2 represents the output of the rate generator 16 and as shown, this output consists of positive pulses 17 of extremely short duration and spaced apart in time by approximately 500 microseconds. The time axis in linear and the irregular line 18 represents an interruption in the time axis to omit presently unimportant time intervals and thereby to shorten the graph without compressing the waveforms.

The periodic pulses 17 actuate the oscillators 14 and 15 both of which are normally biased to cut off. The pulses 17 are applied directly to the 2.5 megacycle blocking oscillator and cause it to generate a few cycles of oscillation substantially in synchronism with the initiating pulse. Blocking oscillators are well known in the art and no specific description of their construction and operation is believed necessary. Curve B of Fig. 2 illustrates the wave forms 19 which are produced periodically and which persist for approximately 10 to 20 microseconds.

Blocking oscillator 15 is also actuated by the rate generator; however, the positive pulses 17 produced by the rate generator for this purpose are first passed through a delay line 20 which preferably is capable of providing adjustable amounts of delay and then is applied to a square wave generator 21 which develops a square wave that actually controls the 12.5 megacycle blocking oscillator 15. It is preferred that the square wave generator be capable of adjustment to permit the generation of square waves having a duration of any desired amount. Thus, the blocking oscillator 15 generates 12.5 megacycle wave energy at a delayed time relative to the time of initiation of the positive pulse 17 produced by the rate generator 16 and of a variable duration. Curve C of Fig. 2 illustrates the wave forms 22 which are periodically generated by the oscillator 15.

Transducer 12 is thus subjected (over line 23) alternately to energy at 2.5 megacycles and to energy at 12.5 megacycles with intervening periods of time when no energy is applied to the transducer 12 over the line 23 and this cycle is repeated periodically at a rate of 2000 times per second. The transducer 12 converts this applied electrical energy into mechanical vibrational energy of corresponding frequency.

Thus, in the system of the invention, the transducer 12 and test body 10 are subjected to successive vibrations the first of which is at a fixed frequency of 2.5 megacycles and the second of which is at a fixed frequency of 12.5 megacycles.

The detecting equipment is not affected by either of these applied vibrational waves when taken individually and this is accomplished by tuning the receiver to a frequency other than the two applied frequencies. More specifically, it is necessary to tune the receiver to a frequency which is a modulation product of the two applied frequencies. Preferably this may be either the sum frequency or the difference frequency and in the present instance the difference frequency of 10 megacycles is selected. Accordingly, the detecting equipment comprises a sharply tuned 10 megacycle filter 25 which is connected between the transducer 12 and a receiver 26, and an indicating device 27 which is energized by the output from the receiver.

Returning now to the instant when the rate generator develops a positive pulse 17 for actuating the blocking oscillators 14 and 15, there will be applied to the transducer 12 a first electrical oscillation of a frequency of 2.5 megacycles and this is converted into a mechanical oscillation of corresponding frequency which is propagated through the holder for reflection from discontinuities presented by the body under test. The detecting equipment being tuned to 10 megacycles is in no way affected by this 2.5 megacycle energy.

Assuming the reflected energy returns to the transducer 12 at a time when the 12.5 megacycle energy is applied thereto, there will be a commingling or mixing of these two vibrational energies in the transducer. Due to non-linearities in the mechanical system of the transducer modulation products of these two frequencies are formed. One of these products is a difference frequency of 10 megacycles and it is passed by the tuned filter 25 for amplification in the receiver and actuation of the indicating device 27.

Should the 2.5 megacycle reflections return to the transducer at a time when no 12.5 megacycle energy is applied thereto, the filter will block out this reflected energy in the same manner as it blocked out the transmitted energy of 2.5 megacycles. Thus, in this very simple system of Fig. 1, the applied energy of 12.5 megacycles may perform the function of a gate.

In order to receive indications from any given stratum in the body under test it is necessary that the application of the 12.5 megacycle energy to the transducer be synchronized with the return of reflections from defects located in the particular stratum under inspection. The delay in the time of application of the 12.5 megacycle energy is controlled to coincide with the travel time of the transmitted energy at 2.5 megacycles in traveling from the transducer to the stratum under test and back. Also, the duration of the 12.5 megacycle energy may correspond with the incremental travel time involved in making a round trip through the stratum under inspection. The delay line 20 and square wave generator 21 may be adjusted in order to test any particular stratum in accordance with these principles. With this arrangement, the indicating device 27 which may be a warning buzzer, or signal light, or a chronograph tape indicates the return of a reflected wave but the location of the reflecting surface is determined by the time of application of the 12.5 megacycle energy.

It will be observed that the system of Fig. 1 may be applied in a somewhat different manner and this will be only briefly outlined since the general arrangement is so common and well known to those skilled in the art.

The system of Fig. 1 might be refined by employing as the indicating device a cathode ray oscilloscope having its vertical plates connected to the output of the receiver 26 and having its horizontal plates connected to a conventional sweep circuit which would in turn be actuated from the pulse generator. Thus the internal structure of the body under test would be depicted in the form of an "A" trace on the oscilloscope screen.

Figure 3:
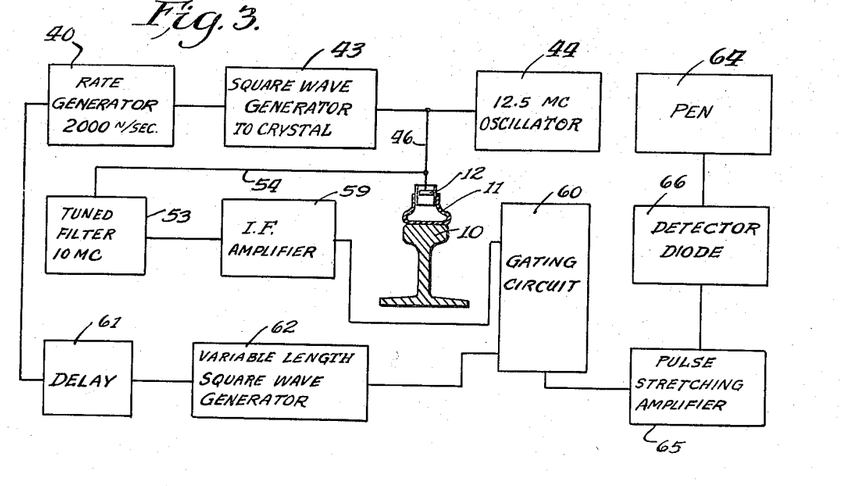
Fig. 3 is a block diagram of the essential components of a similar system based upon the principles of the invention.

Another refinement for use with or without a cathode ray oscilloscope type of indicating device is the use of a directly gated receiver output. Such a gating arrangement is shown in Fig. 3 which illustrates another embodiment of the system of the invention. The delay line 61, square wave generator 62 and gating circuit 60 of Fig. 3 could be connected in an exactly analogous manner in Fig 1 for controlling the receiver output. The connection and function of such a gating arrangement is familiar to those skilled in this art but is described in more detail in connection with Fig. 3. With these arrangements the nicety of adjustment of the time of application of the 12.5 megacycle frequency becomes less important since this frequency no longer serves the dual function of avoiding blocking of the receiver by the transmitted pulse and accomplishing gating but rather performs its basic and inherent function of avoiding blocking of the receiver.

There is, however, another function which the 12.5 megacycle oscillator performs when used in a system employing a gated receiver and this function is that of increasing crystal sensitivity. This is accomplished by applying the 12.5 megacycle wave energy to the crystal at a time somewhat before the return of reflections from strata that are under test as it has been found that when the crystal is actually in a vibrational state at the time that the 2.5 megacycle energy returns, it is more sensitive than if the reflected 2.5 megacycle energy were applied simultaneously with the 12.5 megacycle energy.

Before turning to Fig. 3, it is well to consider the fact that the 12.5 megacycle energy which is applied to the transducer is also propagated through the holder 11 and into the body under test and is reflected from discontinuities in the same fashion as the 2.5 megacycle energy. However, when the reflected 12.5 megacycle energy returns to the transducer there is no other energy being applied to the transducer and the indicating apparatus is effectively isolated by the tuned filter which blocks out the 12.5 megacycle energy. In selecting the pulse repetition rate of the rate generator 16 it is important to bear in mind not only the effect of reverberations within the material but a sufficient interval should be provided so that the 12.5 megacycle energy will always return before the initiation of the next test cycle. Such a correlation of pulse repetition rate with travel time of vibrations through the test body and back to the transducer permits the elimination of false indications such as might occur from reflected 12.5 megacycle energy.

For matters of convenience and operating performance, however, the Fig. 3 system is permitted to develop a continuous wave pattern consisting of periodically applied 2.5 megacycle vibrations and intervening 12.5 megacycle vibrations that are applied during the entire time that the 2.5 megacycle vibrations are absent. The vibrational wave pattern generated by the transducer of Fig. 3 is shown in curve E of Fig. 4.

Obviously the use of a continuous wave type pattern having two different fixed frequencies introduces the problem of false indications arising from a mixing of the transmitted energy of 2.5 megacycle with a reflected portion of the 12.5 megacycle energy that immediately preceded this transmitted energy. Thus, when a continuous wave pattern is employed, an initial signal is developed; however, the magnitude of this signal is never greater than the magnitude of signals produced by the mixing of reflected 2.5 megacycle energy with transmitted 12.5 megacycle energy and therefore the blocking effect of the transmitted signal is still eliminated in the present system.

It is well known that crystal transducers severely attenuate the energy applied thereto in converting it from electrical to mechanical form or vice versa and since the present arrangement requires that indications corresponding to the transmitted signal can only be produced by the mixing of signals which have been transduced and thereby severely attenuated, these initial indications have had to undergo the same degree of attenuation as the desired indications and therefore exert no greater blocking effect than do desired indications.

In addition to this, it is possible to proportion the amplitudes of the 2.5 and the 12.5 megacycle signals so that, in cooperation with the attenuation effect present in all physical systems, the relation of the indicated initial signal to the indicated desired signal becomes even more favorable. The efficiency of mixing of two signals of different frequencies is highest when the mixed signals are of substantially the same amplitudes and is lowest when the mixed signals are of vastly disproportionate amplitudes.

According to the present invention, the amplitude of the 2.5 megacycle signals is considerably larger than the amplitude of the 12.5 megacycle signal, so that after 2.5 megacycle energy has passed through the system and been attenuated to a considerable extent, it will more nearly match the amplitude of the 12.5 megacycle energy which is just being applied to the system. Conversely, the amplitude of the 12.5 megacycle energy is such that after it has passed through the system and been highly attenuated, it is completely overridden by the extremely more powerful 2.5 megacycle energy which is being freshly applied to the system. Thus, the amplitude selection described above results in favorable mixing ratios in the case of desired signals and highly unfavorable mixing ratios in the case of undesired signals.

Referring now to the ultrasonic system of Fig. 3, the test body is again shown as a rail 10 and the transducer 12 is again mounted in a holder 11 adapted for coupling vibrational energy between the transducer and the rail. The operation of the system of Fig. 3 is controlled by a rate generator 40 producing positive pulses 41 at a repetition rate of 2000 cycles per second. Curve A of Fig. 4 illustrates the output from the rate generator and the irregular line 18 again represents an interruption in the time axis.

Figure 4:
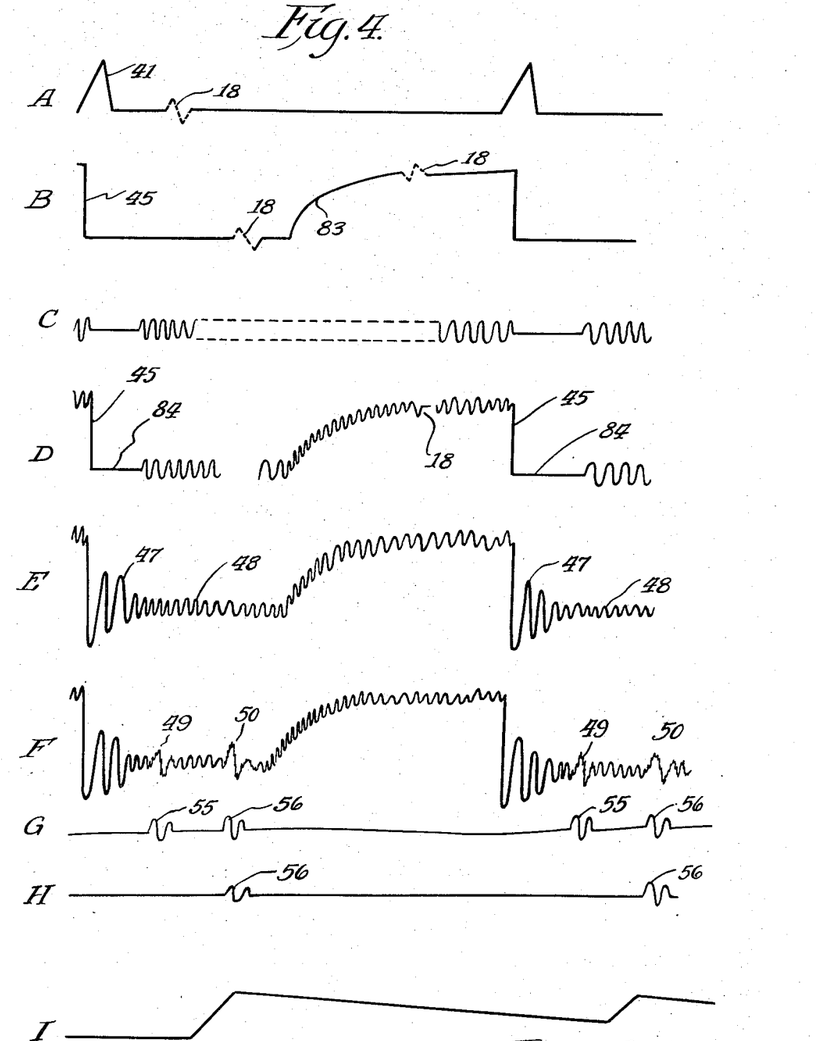
Fig. 4 is a graphical representation of various energy conditions existing in the system of Fig. 3.

The periodically produced pulses 41 trigger a generator 43 that produces a substantially square wave output as shown in curve B of Fig. 4. This voltage wave form of curve B is applied to the transducer 12 and also acts upon a 12.5 megacycle oscillator 44 that is adapted to provide a continuous output except for periodic intervals of short duration during which time it is rendered insensitive due to the influence of the extremely rapid negative descension of the square wave voltage. This portion of the square wave voltage is designated 45 in curve B of Fig. 4. The voltage output from the 12.5 megacycle oscillator is shown in curve C of Fig. 4.

Both the square wave generator 43 and the 12.5 megacycle oscillator 44 supply their output voltage wave forms over a line 46 that connects them to the transducer 12 and hence a composite voltage wave form, curve D of Fig. 4, is applied to the transducer 12. The transducer 12 has a resonant frequence of 2.5 megacycles and the sharp negative voltage descension when applied to the crystal has the effect of releasing the crystal from a compressed condition and permitting it to vibrate freely at its resonant frequency for a short period of time. The 2.5 megacycle mechanical vibration resulting from the crystal ringing at its resonant frequency is designated 47 in curve E of Fig. 4 and the 12.5 megacycle vibrations resulting from the applied voltage of that frequency are designated 48.

It will be noted from an inspection of curve E that the wave form is continuous and this is accomplished by causing the off period of the 12.5 megacycle oscillator to be of the same duration as the ringing time of the crystal. Therefore, the initiation of the 12.5 megacycle vibrations coincides with the termination of the 2.5 megacycle vibrations. Furthermore, the sharp negative descension of the square wave voltage wave form initiates the 2.5 megacycle vibrations and simultaneously terminates the 12.5 megacycle output from oscillator 44. The specific electronic circuitry of the square wave generator 43 and oscillator 44 is shown schematically in Fig. 5 and will be discussed more completely hereinafter.

When the continuous wave form of curve E is propagated into the body under test, the 2.5 megacycle portion 47, which is the first portion of the wave pattern, is reflected from discontinuities and returns to the transducer at a time such that it mixes with the 12.5 megacycle vibrations that are currently developed by the transducer. Curve F of Fig. 4 represents the vibrational pattern that actually exists in the transducer due to mixing of reflected 2.5 megacycle vibrations as described. Wave portions 49 and 50 represent the vibrational patterns resulting from mixing of reflections from the front surface and the rear surface respectively, and these vibrational patterns are shown as consisting of a 2.5 megacycle mechanical wave superimposed upon a 12.5 megacycle wave. Due to nonlinearities in the transducer, these mixed frequencies produce modulation products in the manner previously described, one of which is a difference frequency, namely, 10 megacycles.

When the transducer 12 converts the mechanical energy into electrical energy, it generates electrical signals of the following frequencies: 2.5 megacycles; 10 megacycles; 12.5 megacycles; 15 megacycles; and harmonics of these. These modulation products, of course, occur only during time intervals when there was a nonlinear mixing of the 2.5 megacycle and 12.5 megacycles energies.

The detecting equipment includes a sharply tuned filter 53 that is electrically connected to the transducer 12 by a line 54 and that is arranged to pass only the 10 megacycle energy. Thus, curve G of Fig. 4 indicates that the wave forms 55 and 56 are passed by the filter 53, and these wave forms correspond respectively to the portions 49 and 50 of the mechanical vibration wave shown in curve F.

The wave forms 55 and 56 are amplified in an IF amplifier 59 for presentation to a gating circuit 60 that is controlled in its operation by the positive pulses 41 produced in the rate generator.

The gating circuit 60 functions in the conventional manner in that it passes signals resulting from energy reflected from the particular strata under test and excludes all others. This is accomplished by applying a controlling square wave to the gating circuit at the appropriate interval of time. The beginning point of this interval is controlled by the delay device 61 which delays the positive pulses 41 produced by the rate generator until such time as those reflections which it is desired to record are presented to the gating circuit 60. These delayed pulses therefore initiate a variable length square wave generator 62 which produces a negative gating pulse of adjustable duration. The manner of correlating the initiation and duration of the gating pulse in order to permit inspection of a selected region of the test body is well known and needs no further elaboration. The particular arrangement and operation of the gating circuit 60, however, offers certain advantages over known prior art arrangements. The gating circuit is shown in detail in Fig. 6 and will be described more completely hereinafter.

For the purpose of the present disclosure it will be assumed that the gating circuit is adjusted such that it passes only those reflections which return from the base of the rail and excludes all others. Thus, curve H represents those signals which are passed by the gating circuit and only wave form 56 appears.

It should be apparent that the presence of a flaw, irrespective of its depth, will tend to diminish the strength of the signal that is reflected from the base. The principle of this method of operation is that a constant signal amplitude from the base indicates the absence of any flaws in the body and conversely and diminition of the signal strength returning from the base indicates the presence of a flaw. Actually, it is preferred to employ an attenuation ratio of 10 to 1 so that a flaw indication is made only when the strength of the base echo decreases by a factor of 10. It is desirable when using these relatively high attenuation ratios to shape the beam of ultrasound into a ray of small cross section. It is, of course, possible that the returned signal strength might diminish due to failure of portions of the electronic circuitry or due to the development of inadequate coupling between the transducer and the rail or due to surface formations on the rail capable of blocking the ultrasonic beam, and hence, the system is subject to possible false indications. However, it is important to note that the system fails safe in that it may erroneously indicate a flaw but all flaws which are present will be detected. Fails safe operation simply means that any time the mechanical connection between the transducer and the body under test is interrupted, there is an indication of a flaw. Since such an indication is erroneous, the system has failed to operate correctly, but such a failure will become apparent upon checking the location denoted by the indication. So long as the base echo is detected, the coupling is adequate and it is safe to assume that the rail is being properly tested and is free from flaws.

This method of operation offers unique advantages in the testing of rail since internal defects in rail assume many, varied orientations. Consequently, there is no guarantee that energy reflected from a flow will return to the transducer. In some instances it has been proposed to use a plurality of sending transducers variously orientated in order to overcome this problem.

A pen arrangement is indicated at 64 and is of such character that is ordinarily held in inoperative condition by the energy reflected from the base of the rail. It is necessary, however, to provide holding means so that the impulse resulting from a base reflection maintains the pen inoperative during the interval before the return of the next reflection from the base. Accordingly, a pulse stretching amplifier 65 is connected to the output of the gating circuit and as indicated by curve I of Fig. 4 stretches the wave form 56 over this entire interval. The output from the pulse stretching amplifier is varying at the rate of 2000 cycles per second and since the mechanical inertia of the pen unit 64 is only capable of following at a rate of 400 cycles per second, a defect must block out four or five successive base echo signals in order to allow sufficient time for the pen to act. The output from the pulse-stretching amplifier is passed through a detector diode 66 where it is filtered or smoothed to a constant amplitude for presentation to the pen 64. The presence of output at the pulse-stretching amplifier holds the pen in a normally inoperative condition and only upon the absence of this output will the pen unit function to indicate a flaw.

The system of this invention may also be used for detecting energy reflected from internal flaws and this is accomplished simply by adjusting the gating circuit to pass energy returning at a time corresponding to the particular internal region under inspection and also by arranging the pen to be normally inoperative in the absence of signals and adapted to respond to the presence of a signal to record a flaw. The same type of indicating equipment, namely a pen unit 64, a pulse stretching amplifier 65, and a detector diode 66, may be used when this method of operation is employed.

It is also contemplated that material other than rail can be inspected with this system and furthermore that the transducer may be applied directly to the surface of the body under test. Generally speaking, for the progressive testing of rail it is preferred to interpose a suitable coupling mechanism as indicated at 11; however, the system is not limited thereto, and it should be noted that the coupling mechanism 11 actually introduces a delay in the system and obviates one of the inherent advantages of the present system. It is generally true that any suitable coupling arrangement for transmitting virbrations from a transducer into a rail introduces a significant delay into the system such that even were the receiver to be blocked by the transmitted signal, there would be sufficient time for it to recover before reflections from the test body would return to the transducer. A further fact that should be appreciated is that systems which operate on the principle of base reflections have a built-in delay that affords adequate recovery time for the receiver since the ultrasound must make a round trip through the entire depth of the part under test. Thus, the inherent advantage of avoiding blocking finds application in systems operating on an echo from a defect principle wherein there is little or no delay involved in coupling the transducer to the test part.

Figure 5:
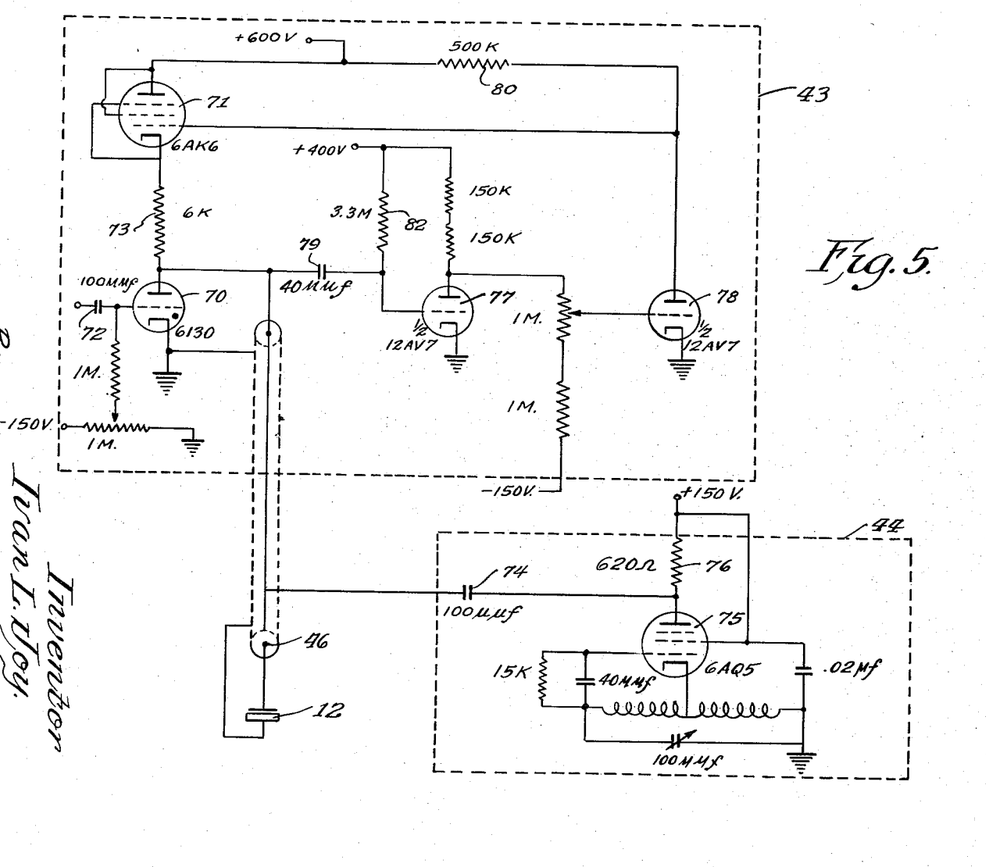
Figs. 5 and 6 are more complete schematic diagrams showing the internal arrangement of certain of the apparatus represented by blocks in Fig. 3.

Referring now to the specific arrangement of the circuitry of the invention, the voltage wave form represented by curve D of Fig. 4 is generated by the circuitry of Fig. 5 in response to the triggering pulses delivered thereto by the rate generator 40. In the normal state, the 12.5 megacycle oscillator 44 generates a continuous output voltage wave form which is applied to the transducer 12 over the line 46 which is here represented as a coaxial cable. The square wave generator 43 includes a thyratron 70, the plate of which is normally held positive. The plate of the thyratron tube 70 is connected to the coaxial cable 46, and during this time of normal operation, applies a positive voltage of approximately 600 volts to the crystal 12 to effectively clamp the crystal in a compressed condition.

When the positive triggering pulses generated by the rate generator 40 are applied to the grid of the thyratron 70 through a coupling condenser 72, the thyratron is fired and in effect places a short circuit across the cable 46 and transducer 12. A large current of approximately 30 amperes results when the short circuit releases the energy stored in the cable 46 and transducer 12. This large current drives the plate of the thyratron 70 in a negative direction at a very rapid rate, and the plate voltage instantaneously changes from aproximately plus 600 volts to approximately zero.

This rapid excursion of the thyratron plate voltage performs two functions. On the one hand, it is applied through coupling capacitor 74 to the plate circuit of oscillator 44 and drives the plate of the oscillator tube sufficiently negative as to terminate the oscillations. After a short interval of time determined by the time constant of coupling capacitor 74 and plate resistor 76, the plate of the tube 75 will recover and permit the restoration of oscillations. On the other hand, the rapid excursion of the thyratron plate voltage excites a square wave generator consisting of the tubes 77 and 78.

More specifically, this rapid negative excursion is coupled to the grid of tube 77 through coupling condenser 79 and renders tube 77, which had been in a conductive state, non-conductive thereby permitting its plate to go strongly positive and drive the grid of tube 78 strongly positive to initiate conduction of tube 78. The current drawn by tube 78 through its plate resistor 80 drives the plate voltage of tube 78 and hence the control grid voltage of a cathode follower tube 71 strongly negative. A resistor 73 is connected between the cathode of tube 71 and the plate of the thyratron 70 and allows the voltage excursion of the plate of the thyratron tube to proceed more freely and prevents the development of any heavy currents in the cathode follower tube 71.

Due to the action of tubes 77 and 78, the cathode follower tube 71 is rendered non-conductive and this interrupts the plate circuit of the thyratron tube 70 which is also immediately rendered non-conductive. The square wave generator circuit is adjusted so that the plate of the thyratron tube 70 is held at substantially zero voltage by the current that is conducted through the cathode follower tube 71, and this condition persists for approximately 250 microseconds. After the cathode follower tube is rendered non-conductive the positive voltage which was built up across the coupling capacitor 79 and maintained by the 3.3 megohm resistor 82, gradually leaks off and lets the multivibrator 77 and 78 reverse its position slowly so that there is no RF component in the voltage wave form on the plate of the thyratron 70. Hence, no RF component is applied to the transducer 12 from the square wave generator circuit 43.

It should be apparent that the portion 83 of curve B of Fig. 4 represents this gradual reversal of the multivibrator position. Thus, for each square wave cycle generated by the multivibrator there is only one portion 45 which actuates the transducer 12. The composite voltage wave form that is applied to the transducer 12 is shown in curve D of Fig. 4, and it will be noted that the portion 84 wherein there are substantially no voltage variations is of such a duration as to permit the mechanical ringing of the transducer to terminate simultaneously with the application of the 12.5 megacycle energy. This is accomplished by correlating the time constant of the circuit consisting of capacitor 74 and resistor 76 with the ringing time of the crystal 12.

It is pertinent to point out that with this arrangement the crystal is in a state of excitation at the time that the reflected 2.5 megacycle energy returns, and this method of operation has been found to render the crystal more sensitive by a factor of from 2 to 3. Presumably, this important improvement in sensitivity results from peak resolvements in the mechanical vibrations.

Figure 6:
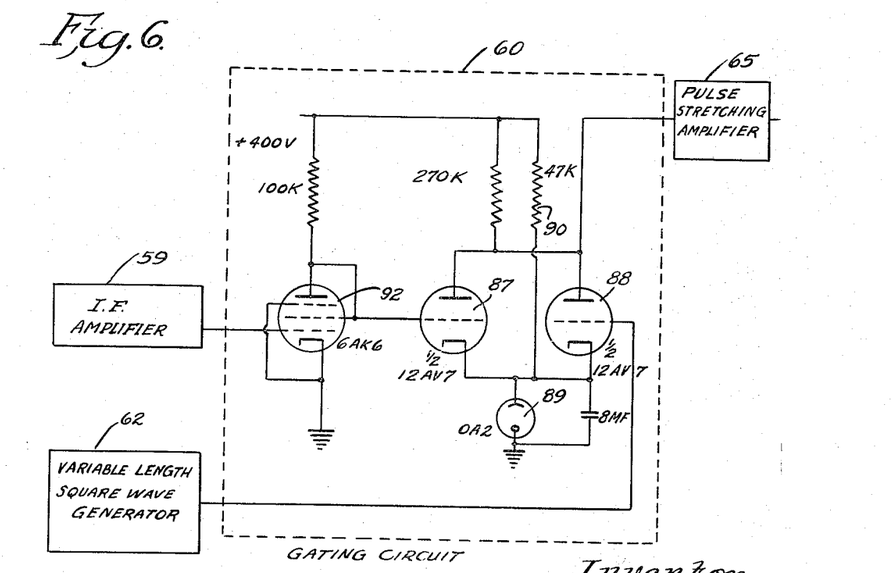

Specific gating circuitry is shown in Fig. 6 and it includes a locking arrangement consisting of tubes 87 and 88, the plates and cathodes of which are connected together. In addition, the cathodes of the locking tubes 87 and 88 are connected to an OA2 regulator tube 89 which maintains the cathode at a positive potential of approximately 105 volts. This voltage is maintained by a 47K resistor 90 that is connected to plus 400 volts. Thus in its normal condition the gating circuit is arranged so that tubes 87 and 88 are conducting and therefore their plate voltages are maintained as far negative as possible.

Assuming now that the signals 55 and 56 of curve G in Fig. 4 are delivered from the IF amplifier 59 to the gating circuit 60, they are both converted in the phase inverter tube 92 to negative pulses which are applied to the grid of tube 87. These negative pulses terminate conduction in tube 87 and, circumstances permitting, will cause the plate of tube 87 to go positive and deliver a positive indication to the pulse stretching amplifier 65. However, the tube 88, due to the gating sequence whereby it is desired to eliminate the front surface reflections, still has its plate maintained negative and this fact prevents any positive voltage excursion of the plate of tube 87. In the case of wave form 56 representing a reflected signal from the base, the gating circuit will have been supplied with a negative square wave which is applied to the grid of tube 88 and which immediately renders this tube non-conductive. Therefore, when a negative pulse corresponding to wave form 56 is applied to the grid of the tube 87 to stop conduction thereof, both plates make a positive voltage excursion and deliver a positive pulse to the pulse stretching amplifier and the remainder of the detecting equipment.

This arrangement has important advantages over prior art arrangements wherein a single tube is employed for accomplishing gating since the steep sides of the square wave control pulses frequently filter through the apparatus and appear as false indications. The present arrangement not only overcomes this disadvantage, but also is particularly adapted to situations wherein a plurality of gating circuits will be fed from the same testing apparatus. In other arrangements, capacity effects between the various tubes lowers the impedance between gating circuits and greatly reduces their exactness, but the present arrangement is not affected by such difficulties.

From the foregoing explanation it should be apparent that the use in an ultrasonic system of a noncontinuous pattern having successive waves of two different fixed frequencies inherently eliminates any blocking effect of the transmitted signal. Furthermore, the attenuation introduced by the crystal is sufficient even in the case of a continuous pattern system to prevent blocking of the receiver although some slight indication is present.

Another important advantage of the invention results from operation of the apparatus such that an indication of a flaw is made whenever the base reflection is absent. This operation not only introduces a delay corresponding to the travel time of the energy through the test body, but also permits the detection of flaws irrespective of their plane of orientation. This operation also offers the advantage that it fails safe in that such problems as the loss of adequate coupling will appear as a flaw whether or not a flaw appears at that particular point in the body under test. The operator is thus alerted and by additional testing can correct such difficulties. Using conventional echo from a defect testing procedures loss of coupling will result in a possible failure to detect a flaw.

An improved gating arrangement and improved operation of transducer such that it functions in a more efficient manner are also important advances of the invention.

I claim:

1. Apparatus for generating a continuous vibrational wave pattern consisting of periodically occurring vibrations of a first fixed frequency and intervening vibrations of a second fixed frequency, said apparatus comprising an electromechanical transducer having a resonant frequency corresponding to said first frequency and having electrically conductive means for applying potential thereto, a normally operative oscillator generating a voltage output of said second fixed frequency, a capacitor coupling the output of said oscillator to said electrically conductive means, a rate generator, a voltage wave form generating device connected to said rate generator for actuation thereby to produce a wave form having a steep side, means connecting the output of said wave form generating device to said electrically conductive means whereby the steep side of said wave form excites said transducer into vibration at its resonant frequency for a given interval and momentarily blocks said oscillator, and means in said oscillator for maintaining said oscillator blocked during said interval.

2. In testing apparatus, in combination an electromechanical vibration transducer, generating means having an electrical output coupled to said transducer and adapted to actuate said transducer into momentary vibration at a first fixed frequency, an oscillator having a different fixed frequency output coupled to the output of said generating means and adapted to be blocked thereby, rate means generating periodic output pulses for controlling the actuation of said generating means, said transducer being mechanically coupled to a body under test such that said transducer is subjected simultaneously to vibration at one of said fixed frequencies mixed with reflected vibration at said other fixed frequency thereby producing energy at frequencies corresponding to the heterodyne products thereof and the pulse rate of said rate generator being correlated with the propagation characteristics of the transducer and body under test such that the interval between successive pulses is greater than the maximum travel time of said vibrations, and receiving means actuated by said transducer, said receiving means being tuned to one of said heterodyne frequencies of said two frequencies and deriving energy only at said one heterodyne frequency.

3. In testing apparatus, in combination an electromechanical vibration transducer, generating means having an electrical output coupled to said transducer and adapted to actuate said transducer into momentary vibration at a first fixed frequency, an oscillator having a different fixed frequency output coupled to the output of said generating means and adapted to be blocked thereby, the amplitude of the output of said generating means being substantially larger than the output of said oscillator, rate means generating periodic output pulses for controlling the actuation of said generating means, said transducer being mechanically coupled to a body under test such that said transducer is subjected simultaneously to vibration at one of said fixed frequencies mixed with reflected vibration at said other fixed frequency thereby producing energy at frequencies corresponding to the heterodyne products thereof and the pulse rate of said rate generator being correlated with the propagation characteristics of the transducer and body under test such that the interval between successive pulses is greater than the maximum travel time of said vibrations, and receiving means actuated by said transducer, said receiving means being tuned to one of said heterodyne frequencies of said two frequencies and deriving energy only at said one heterodyne frequency.

4. In testing apparatus, in combination, a pulse rate generator, generating means coupled to said pulse rate generator and having an electrical output of fixed waveform characteristic to generate a signal of momentary duration upon actuation by a pulse from the rate generator, an oscillator having an output of different waveform characteristic, the output of said oscillator being a train of waves, said oscillator being coupled to the output side of said generating means and adapted to be blocked momentarily by the output thereof, and a utilization circuit coupled to said generating means and said oscillator whereby said utilization circuit is supplied with their outputs in succession.

5. In testing apparatus, in combination an electromechanical vibration transducer, generating means having an electrical output coupled to said transducer and adapted to actuate said transducer into momentary vibration at a first fixed frequency, an oscillator having a continuous output of a different fixed frequency coupled to the output of said generating means and adapted to be blocked thereby, rate means generating periodic output pulses for controlling the actuation of said generating means, said transducer being mechanically coupled to a body under test such that said transducer is subjected simultaneously to vibration at one of said fixed frequencies mixed with reflected vibration at said other fixed frequency thereby producing energy at frequencies corresponding to the heterodyne products thereof and the pulse rate of said rate generator being correlated with the propagation characteristics of the transducer and body under test such that the interval between successive pulses is greater than the maximum travel time of said vibrations, means connected to said transducer and tuned to the frequency of one of said heterodyne products for receiving energy in a frequency band corresponding to said one of said heterodyne products, and indicating means responsive to the output of said receiving means.

6. In testing apparatus, in combination an electromechanical vibration transducer, generating means having an electrical output coupled to said transducer and adapted to actuate said transducer into momentary vibration at a first fixed frequency, an oscillator having a continuous output of a different fixed frequency coupled to the output of said generating means and adapted to be blocked thereby, rate means generating periodic output pulses for controlling the actuation of said generating means, said transducer being mechanically coupled to a body under test such that said transducer is subjected simultaneously to vibration at one of said fixed frequencies mixed with reflected vibration at said other fixed frequency thereby producing energy at frequencies corresponding to the heterodyne products thereof and the pulse rate of said rate generator being correlated with the propagation characteristics of the transducer and body under test such that the interval between successive pulses is greater than the maximum travel time of said vibrations, receiving means connected to said transducer and tuned to the frequency of one of said heterodyne products, delay means coupled to said rate means to retard the output pulses a selected interval of time, and a gating circuit coupled to said delay means and controlled by said pulses, said gating circuit being coupled to said receiving means to control the output thereof, said gating circuit limiting said output to energy corresponding to a selected portion of said body.

7. In testing apparatus, in combination an electromechanical vibration transducer, generating means having an electrical output coupled to said transducer and adapted to actuate said transducer into momentary vibration at a first fixed frequency, an oscillator having a continuous output of a different fixed frequency coupled to the output of said generating means and adapted to be blocked thereby, rate means generating periodic output pulses for controlling the actuation of said generating means, said transducer being mechanically coupled to a body under test such that said transducer is subjected simultaneously to vibration at one of said fixed frequencies mixed with reflected vibration at said other fixed frequency thereby producing energy at frequencies corresponding to the heterodyne products thereof and the pulse rate of said rate generator being correlated with the propagation characteristics of the transducer and body under test such that the interval between successive pulses is greater than the maximum travel time of said vibrations, receiving means connected to said transducer and tuned to the frequency of one of said heterodyne products, delay means coupled to said rate means to retard the output pulses, and a gating circuit coupled to said delay means and controlled by said pulses, said gating circuit being coupled to said receiving means to control the output thereof, said delay and said gating circuit being adjustable to limit said output to energy corresponding to any selected portion of said body.

8. In testing apparatus, in combination an electromechanical vibration transducer, square wave generating means having its output coupled to said transducer and adapted to actuate said transducer into momentary vibration at a first fixed frequency, an oscillator having a different fixed frequency output coupled to the output of said square wave generating means and adapted to be blocked thereby, rate means genrating priodic output pulses for controlling the actuation of said square wave generating means, said transducer being mechanically coupled to a body under test such that said transducer is subjected simultaneously to vibration at one of said fixed frequencies mixed with reflected vibration at said other fixed frequency thereby producing energy at frequencies corresponding to the heterodyne products thereof and the pulse rate of said rate generator being correlated with the propagation characteristics of the transducer and body under test such that the interval between successive pulses is greater than the maximum travel time of said vibrations, and receiving means actuated by said transducer, said receiving means being tuned to one of said heterodyne frequencies of said two frequencies and deriving energy only at said one heterodyne frequency.

9. In apparatus for testing the structural characteristics of a body by the use of elastic waves capable of being reflected from discontinuities therein; said apparatus including a non-linear electromechanical transducer operatively coupled to the body under test, means connected to said transducer for sequentially producing vibrational wave energy in said transducer of a first fixed frequency and a second fixed frequency timed in duration and occurrence relative to the propagation characteristics of a body under test such that said transducer is subjected simultaneously to vibration at said second fixed frequency mixed with reflected vibration at said first fixed frequency, means connected to said transducer and tuned to the frequency of one of the heterodyne products resulting from mixing in said transducer of energy of said first frequency reflected from some point in said body with energy of said second fixed frequency for receiving energy in a frequency band corresponding to said one of the heterodyne products, and indicating means responsive to the output of said receiving means.

10. In apparatus for testing the structural characteristics of a body by the use of elastic waves capable of being reflected from discontinuities therein; said apparatus including non-linear electromechanical transducer means operatively coupled to the body under test for transmitting and receiving vibrations to and from said body, first means operatively connected to said transducer means for sequentially producing vibrational wave energy therein of a first fixed frequency and a second fixed frequency timed in duration and occurrence relative to the propagation characteristics of a body under test such that said transducer means is subjected simultaneously to vibration at said second fixed frequency mixed with reflected vibration at said first fixed frequency, second means operatively connected to said transducer means and tuned to the frequency of one of the heterodyne products resulting from mixing in said transducer of energy of said first fixed frequency reflected from some point in said body with energy of said second fixed frequency for receiving energy in a frequency band corresponding to said one of the heterodyne products, and indicating means responsive to the output of said receiving means.

11. In apparatus for testing the structural characteristics of a body by the use of elastic waves capable of being reflected from discontinuities therein, said apparatus including non-linear electromechanical transducer means operatively coupled to the body under test for transmitting and receiving vibrations to and from said body, means operatively connected to said transducer means for setting up continuous vibrational wave energy therein consisting of a periodically recurring momentary vibrational energy of a first fixed frequency and an interim vibrational wave energy of a second fixed frequency, control means connected to said first and second means and actuating the same in timed relationship such that said non-linear mechanical means is subjected simultaneously to vibration at said second fixed frequency mixed with reflected vibrations at said first fixed frequency, means operatively connected to said transducer means and tuned to the frequency of one of the heterodyne products resulting from mixing in said transducer of energy of said first fixed frequency reflected from some point in said body with energy of said second fixed freqency for receiving energy in a frequency band corresponding to said one of the heterodyne products, and indicating means responsive to the output of said receiving means.

12. The combination with apparatus for testing the structural characteristics of a body by the use of elastic waves, said apparatus including electromechanical vibration transducer means operatively coupled to the body under test for transmitting and receiving vibrations to and from said body, generating means connected to said transducer means for setting up a vibrational test signal of distinctive frequency characteristic and of finite duration in said transducer means for transmission of said signal into said body and reflection of said signal from discontinuities therein, receiving means connected to said transducer means to produce output from energy derived from said transducer means during the arrival thereat of the energy of said reflected test signal, and indicating means responsive to output from said receiving means for producing an indication of the structural characteristics of said body; of means for coupling to said transducer means for applying thereto a second signal having a frequency characteristic different than that of said test signal for independently vibrating said transducer means, with said generating means including means connected to said last named means for controlling the same in timed relation to the setting up of said test signal such that said second signal is applied to said transducer means prior to and during the reception of the reflected test signal such that said transducer means is rendered more sensitive to the reflected test signal.

13. In apparatus for testing the structural characteristics of a body by the use of elastic waves capable of being reflected from discontinuities therein; said apparatus including electromechanical transducer means operatively coupled to the body under test for transmitting and receiving vibrations to and from said body, first means operatively connected to said transducer means for sequentially producing vibrational wave energy therein at a first frequency characteristic and at a second frequency characteristic different from said first frequency characteristic and timed in duration and occurrence relative to the propagation characteristics of the body under test such that said transducer means is subjected to vibration at said second frequency characteristic prior to and during the arrival at said transducer means of reflected vibration of said first frequency characteristic, receiving means operatively connected to said transducer means to produce output from energy derived from the energy of said reflected vibration of said first frequency characteristic that arrives at said transducer means while said transducer means is subjected to vibration of said second frequency characteristic, and indicating means responsive to output from said receiving means.

References Cited in the file of this patent

UNITED STATES PATENTS

| | | |
|---|---|---|
| 2,433,669 | Keister | Dec. 30, 1947 |
| 2,463,328 | Sproule | Mar. 1, 1949 |
| 2,562,449 | De Lano | July 31, 1951 |
| 2,651,012 | Van Valkenburg et al. | Sept. 1, 1953 |